(12) United States Patent
Haas et al.

(10) Patent No.: US 8,973,010 B2
(45) Date of Patent: Mar. 3, 2015

(54) SCHEDULING IMAGE RECOGNITION TASKS BASED ON TASK DEPENDENCY AND PHASE

(75) Inventors: Benjamin Haas, Wabern (CH); Thomas Coradi, Zurich (CH)

(73) Assignee: Varian Medical Systems International, AG, Cham (CH)

( * ) Notice: Subject to any disclaimer, the term of this patent is extended or adjusted under 35 U.S.C. 154(b) by 725 days.

(21) Appl. No.: 12/789,981

(22) Filed: May 28, 2010

(65) Prior Publication Data

US 2011/0292056 A1 Dec. 1, 2011

(51) Int. Cl.
G06F 9/46 (2006.01)
G06F 9/50 (2006.01)
G06K 9/00 (2006.01)

(52) U.S. Cl.
CPC .......... *G06F 9/5066* (2013.01); *G06K 9/00993* (2013.01); *G06K 2209/05* (2013.01)
USPC .......................................... 718/105; 718/106

(58) Field of Classification Search
CPC ....................... G06K 2209/05; G06K 9/00993
See application file for complete search history.

(56) References Cited

U.S. PATENT DOCUMENTS

| | | | |
|---|---|---|---|
| 2003/0217089 A1* | 11/2003 | Bakow et al. ................. | 709/100 |
| 2006/0224432 A1* | 10/2006 | Li ..................................... | 705/9 |
| 2007/0110094 A1* | 5/2007 | Tobita et al. ................... | 370/453 |
| 2009/0171244 A1* | 7/2009 | Ning et al. ..................... | 600/567 |
| 2009/0313636 A1* | 12/2009 | Barsness et al. .............. | 718/105 |
| 2010/0043001 A1* | 2/2010 | Stolpe ........................... | 718/102 |
| 2010/0049740 A1* | 2/2010 | Iwase et al. ................ | 707/104.1 |
| 2010/0122262 A1* | 5/2010 | Van Dyke et al. ............ | 718/104 |
| 2010/0333097 A1* | 12/2010 | Johnson et al. ............... | 718/102 |
| 2011/0106713 A1* | 5/2011 | Kapoor et al. ................ | 705/301 |

* cited by examiner

*Primary Examiner* — Meng An
*Assistant Examiner* — James J Lee (57) ABSTRACT

Embodiments of the present invention are directed to techniques for providing an environment for the efficient execution of recognition tasks. A novel environment is provided which automatically and efficiently executes a recognition program on as many computer processors as available. This program, deconstructed into separate tasks, may be executed by constructing a dependency network from known inputs and outputs of the tasks, applying project planning methods for scheduling these tasks into multiple processing threads, and dynamically assigning tasks within these threads to processors. Therefore, an efficient schedule of tasks to complete a recognition program can be created and executed automatically, for any type of recognition problem. The system will not only allow for the ability to leverage multiple processors for efficiently generating variable and customizable automatically created schedules, but will also still maintain the flexibility to use serial programming in recognition algorithms for individual objects, properties, or features.

19 Claims, 5 Drawing Sheets

SCHEDULING IMAGE RECOGNITION TASKS BASED ON TASK DEPENDENCY AND PHASE

TECHNICAL FIELD

The present invention pertains generally to image recognition techniques in medical science, and, in particular, involves mechanisms for improved automatic identification of anatomical structures in diagnostic and treatment applications.

BACKGROUND

The usage of medical imaging devices to diagnose and plan treatment for various internal ailments is well known. Often, an imaging device such as an X-ray device, Computer Tomography (CT), or Magnetic Resonance Imaging (MR) device is used to generate one or more initial scans or images of the area of interest. These initial scans may be acquired by focusing a beam of radiation into a target volume and collecting the traversing beams in an imager. The beams collected by the imagers are used to generate a display (i.e., one or more images) of the targeted volume that may be used to diagnose or monitor an afflicted area (e.g., a tumor or lesion or a surrounding area).

Typically, once an image has been acquired, critical and/or target structures (e.g., regions or organs) disposed in the target area must be specifically identified so that treatment may be optimally directed. Conventional medical imaging techniques include techniques for automatically identifying ("segmenting") organs, specific locations (landmarks), and large structures. These techniques are commonly performed according to one or more specific recognition processes, and often include delineating adjacent structures by derived radiodensities and classifying the structures according to their relative positions and derived densities with known values. Recently, these recognition processes have been performed automatically, through computerized recognition processes.

These computerized recognition processes are often structured around achieving an objective, such as recognizing a specified structure or portion of a subject's anatomy. Commonly, these recognition processes are divided into, and performed as, a number of disparate recognition tasks. Each recognition task solves a part of the problem by detecting certain information (outputs), using a data signal directly and/or information found by other tasks (inputs).

A recognition objective may be thus achieved by executing a set of tasks in an appropriate order. In software implementations, inputs and outputs of tasks are described by data objects of many different types. Data objects may describe a signal (e.g., an image) or a transformed part of a signal (e.g., a filtered image region), they may describe a property or feature of a signal or of other objects (e.g., an intensity profile of an image), or they may describe a specific location or structure of the subject's anatomy.

In any such system, the required inputs of each task and its potential outputs are typically known statically, before the software is run. Unfortunately, the set of available inputs on the object storage, the set of desired outputs, the estimated durations of individual recognition tasks, and the set of available processors, however, are generally only known dynamically. As a consequence, determining even modestly efficient schedules manually can be either extremely time consuming, or, in many cases, not possible at all.

Furthermore, issues of complexity increase quickly with the number of recognition tasks. In environments with a varying set of desired outputs, varying task durations, and/or a varying number of processors, it is not currently possible to create a schedule manually, at design time. This problem is further exacerbated by the lack of simple programming environments on standard software development platforms, which typically leads to recognition software being developed either sequentially, redundantly (detecting objects that are not used), or on complex, dedicated (and potentially costly) architectures.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the present invention are directed to techniques for providing an environment for the efficient execution of recognition tasks. In one embodiment, a novel environment is provided which automatically and efficiently executes the recognition program on as many computer processors as available. This recognition program, consisting of a multitude of separate, related tasks, may be executed by constructing a dependency network from known inputs and outputs of the tasks, applying project planning methods for scheduling these tasks on one or multiple processors (or threads), dividing a schedule into phases, and, within these phases, dynamically assigning tasks to the processors (or threads).

According to such embodiments, an efficient schedule of tasks to complete a recognition program can be created and executed automatically, for any type of recognition problem. Moreover, the architecture of the environment also allows easy integration of algorithmic software from different teams or companies. The system will not only allow for the ability to leverage multiple processors for efficiently generating variable and customizable automatically created schedules, but will also still maintain the flexibility, whenever necessary, to use serial programming in recognition algorithms for individual objects, properties, or features.

By enabling such a system, development of recognition tools by software vendors may also be advantageously streamlined, as programmers can concentrate on implementing the recognition tasks in a sequential way, free from dealing with inter-task dependencies and concurrency issues that might be obstacles in traditional methods of developing such tools.

BRIEF DESCRIPTION OF DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternatives, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, and components, have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 1) describing the operations of this method, such steps and sequencing are exemplary. Embodiments are well suited to performing various other steps or variations of the steps recited in the flowchart of the figure herein, and in a sequence other than that depicted and described herein.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

While the following exemplary configurations are shown as incorporating specific, enumerated features and elements, it is understood that such depiction is exemplary. Accordingly, embodiments are well suited to applications involving different, additional, or fewer elements, features, or arrangements. In the following embodiments, techniques are described for the optimization of scheduling a program into a plurality of tasks for parallel execution. Embodiments include methods for scheduling a plurality of tasks to produce a desired output, wherein the plurality of tasks is distributed into a plurality of phases and to a plurality of processors for execution.

Exemplary Task Scheduling

Figure 1:
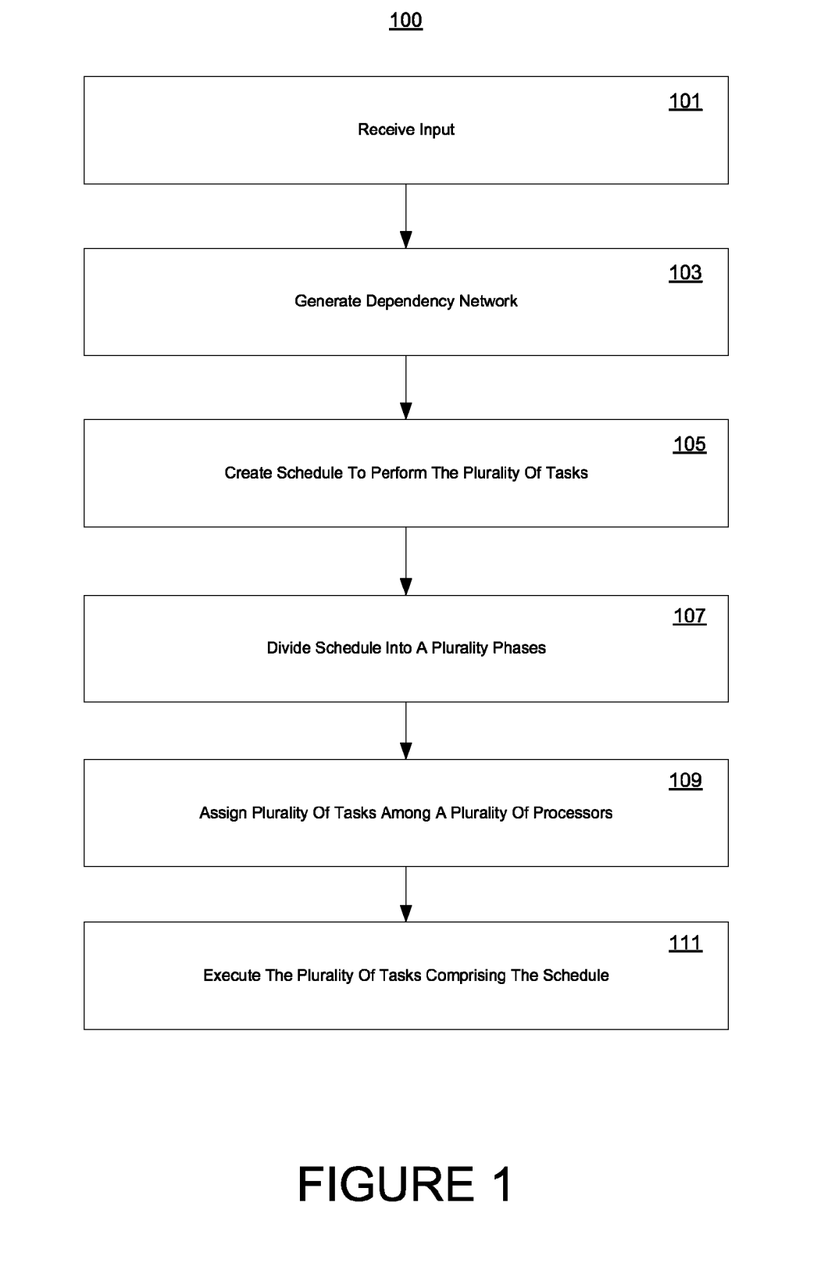
FIG. 1 is a flowchart of one embodiment of a method for scheduling a plurality of tasks to produce a desired output, in accordance with various embodiments of the claimed subject matter.

FIG. 1 is a flowchart 100 of one embodiment of the method for scheduling a plurality of tasks to produce a desired output. Steps 101-109 describe exemplary steps comprising the process depicted in flowchart 100 in accordance with the various embodiments herein described. In one embodiment, the flowchart 100 is implemented as computer-executable instructions stored in a computer-readable medium.

Input is received at step 101. According to one aspect of the invention, the input received may include a recognition problem to be solved, a desired output which, when generated, solves the recognition problem, a plurality of tasks whose performance achieves the desired output and a plurality of data sets upon which the plurality of tasks may be performed on. The input may be received, for example, in an application executing in a computing system. The output of the program may be achieved by, for instance, parsing or manipulating the data comprising the data sets. In one embodiment, the one or more data sets may represent one or more images and may be received in, or alternatively, accessed from, a remote location by an image processing application during execution of the program. For example, the data sets may comprise data representing one more images of a subject (e.g., a human anatomy) generated by a medical imaging device, such as computer tomography (CT) device.

According to these embodiments, the input may comprise an image recognition problem, wherein the desired output may correspond to specifically identifying particular structures or regions (e.g., organs, vessels, or other structures of the subject anatomy) within the one or more images. These structures may be represented by corresponding graphical structures classifying or labeling the pixels comprised in the images. In further embodiments, the data sets processed during the program execution may be pre-generated and pre-stored in one or more storage mediums and remotely accessible to the image processing application through a communicatively coupled computing system. In alternate embodiments, the data sets may be dynamically generated by a communicatively coupled imaging device and accessed presently to generate the desired output. In still further embodiments, a recognition problem may be selected by a user of the image processing application by selecting a desired output from a pre-stored plurality of pre-defined outputs and the data sets from a source of data sets, such as through a user interface instantiated by the image processing application on a computing system operated by the user.

A desired output may be the product of a plurality of tasks, at least a portion of which must be executed in a particular sequence. For example, input provided with the data sets may be insufficient, on its own, to directly determine the desired output absent additional logical derivations. Accordingly, in some embodiments, the input may include a plurality of tasks. For example, in an image recognition program, given an input of one identified structure, the identity (e.g., the relative location and position) of an alternative structure (the output) may be achieved by using the identified structure as input and successively identifying (or otherwise determining) the identities of other (e.g., adjacent) structures based on the given identified structure, according to pre-established algorithms (e.g., relative position with respect to the identified structure). Therefore, the particular sequence of tasks whose performance is required to achieve the desired output may be selected based on the data input and the desired output as a set of tasks from the plurality of tasks received with the input.

At step 103, a dependency network is generated for the plurality of tasks received with the input at step 101. The dependency network may be generated by, for example, analyzing the plurality of tasks to derive a corresponding plurality of respective inputs and outputs and subsequently mapping the plurality of tasks according to the plurality of respective inputs and outputs to determine one or more appropriate sequences to achieve the desired output. Thus, for example, tasks which require as input the output of other tasks may be mapped accordingly, such that for any generated sequence of tasks to produce the desired output, dependent tasks may be positioned after their dependencies.

At step 105, a schedule is created for a set of tasks comprised in the plurality of tasks according to the dependency network generated at step 103. The schedule may comprise, for example, a selection of one of any number of derived sequences of tasks which may produce the desired output. In one embodiment, the sequence selected to comprise the schedule may be the optimal sequence according to a heuristic (e.g., least amount of tasks, earliest possible start time for each task and/or fastest estimated execution time). According to further embodiments, the schedule may also be generated to consider estimations of processing or execution times required by a task. In one embodiment, creating a schedule for a plurality of tasks may be implemented by plotting an order to perform the plurality of tasks according to respective dependencies of the dependency network for the plurality of tasks and respective estimated execution times for the plurality of tasks, dividing the schedule into a plurality of concurrent phases, and distributing the plurality of tasks in the plurality of phases according to the order plotted.

The schedule may also be generated to distribute the plurality of tasks to be processed in a plurality of separate processing threads, such that mutually independent tasks and tasks with similar estimated execution times may be performed simultaneously. In further embodiments, the computing system performing the program may be implemented as a multi-processor system. According to these embodiments, simultaneous execution of mutually independent tasks may be performed in multiple processors of the multi-processor system in parallel. According to these embodiments, for example, any mutually independent tasks may be assigned to the same phase, distributed to different processors for processing, and performed in parallel.

At step 107, the schedule of tasks derived at step 105 may be assigned to a plurality of processors in a multi-processor system. In some embodiments, the plurality of tasks may be assigned dynamically, during run time execution of the tasks. This allows flexibility in schedule execution and allows computing resources to be applied efficiently whenever the resources may be made available. In addition, once assigned, the plurality of tasks may be executed in the plurality of processors of the multi-processor system.

Exemplary Network Relationship

Figure 2:
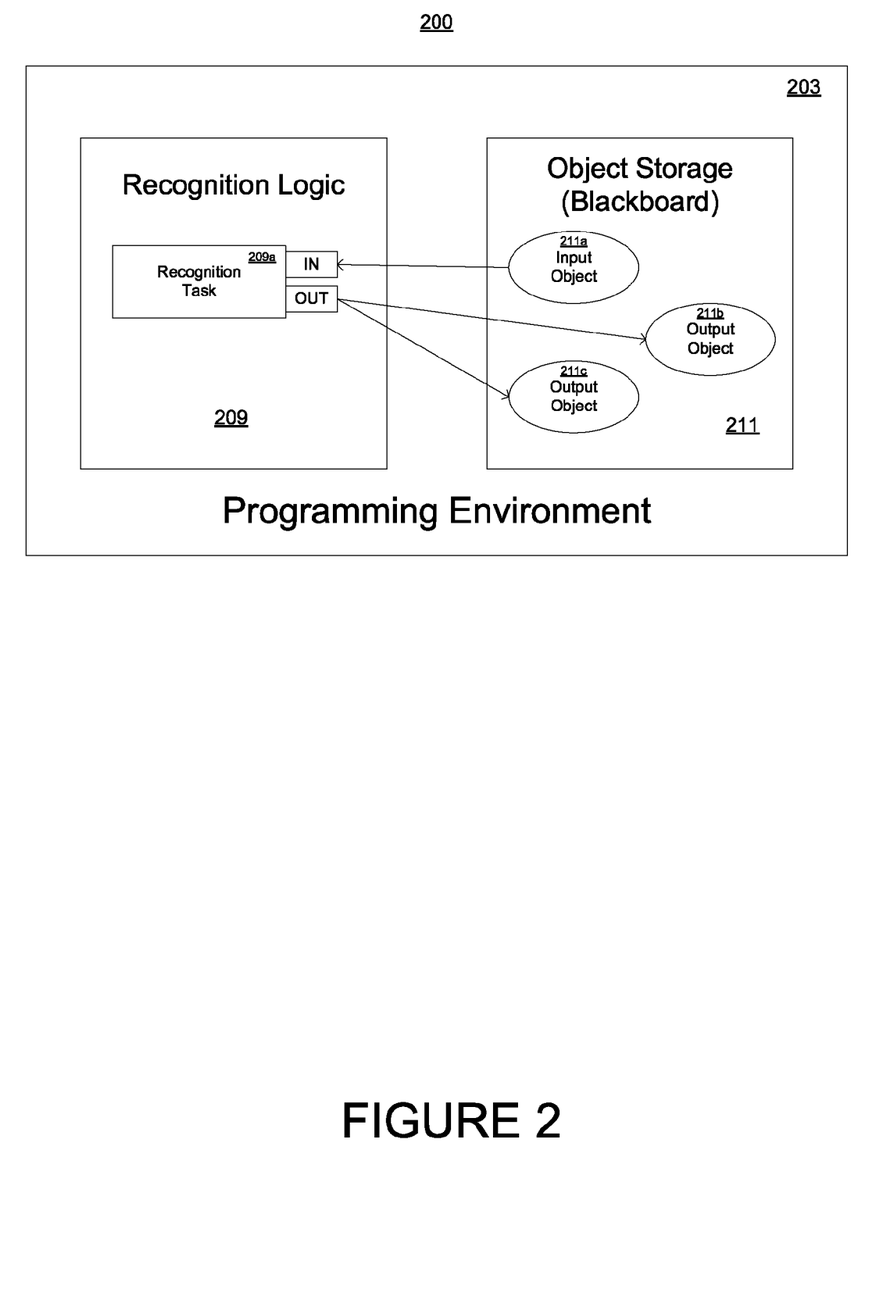
FIG. 2 is an illustration of a diagram depicting exemplary task-object relationships in a dependency network, in accordance with various embodiments of the claimed subject matter.

FIG. 2 is an illustration of a diagram depicting exemplary task-object relationships in a dependency network 200, in accordance with various embodiments of the claimed subject matter. In one embodiment, a recognition program comprising an input of data may achieve a desired output through the performance of a collection of tasks that, when performed in sequence, produce the information necessary to derive the desired output. The recognition program may be deconstructed as a plurality of tasks or functions, which use either the given data as input or output from another, related task or function. The relationship between the inputs and outputs of a plurality of tasks may be mapped to form a dependency network, and subsequently referenced to generate a schedule to achieve a desired output. As presented in FIG. 2, arrows show the flow of information in the dependency network 200.

As presented in FIG. 2, a task (e.g., recognition task 209a) may comprise specified inputs and outputs (e.g., input object 211a, output objects 211b, and 211c). According to such a configuration, the execution of recognition task 209a, given as input the input object 211a will generate as output the output objects 211b and 211c. Thus, for example, given a CT image of a human subject (input), an output of a body outline of the subject and the gender may be determined.

According to some embodiments, the individual tasks may be stored in a collection or storage of tasks (e.g., logic storage unit 209). In further embodiments, the specific objects that comprise the input and outputs corresponding to the tasks may be stored in a separate object storage unit 211. Both storage units may be stored in memory of a computing system, for example, and accessible through a programming environment 203 operating on the computer system. Accordingly, given as input an object whose relationship is known in the programming environment 203 to one or more functions or tasks, related objects may be derived as the desired output for one or more recognition programs.

Exemplary Computing Platform

Figure 3:
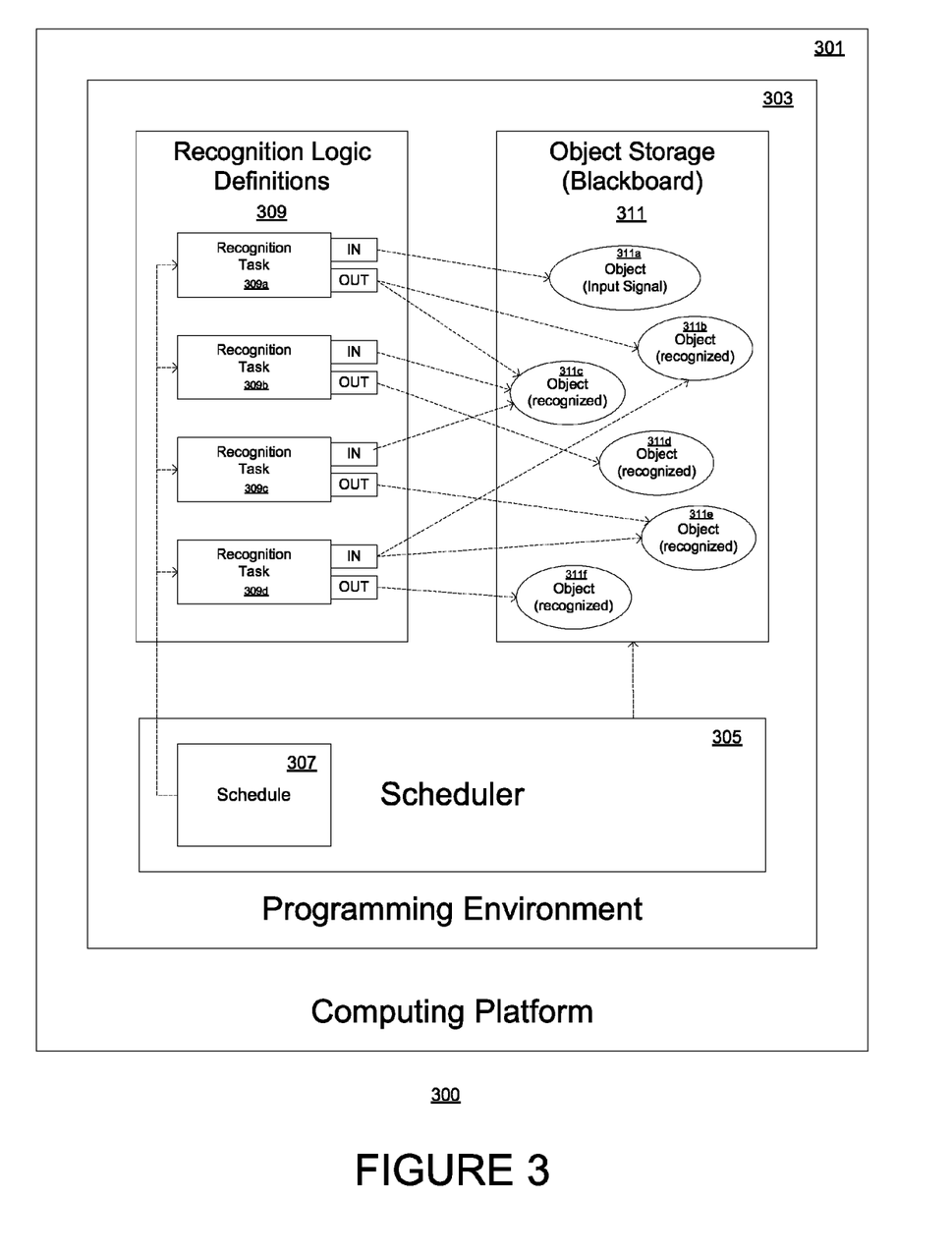
FIG. 3 is an illustration of a block diagram depicting an exemplary computing environment, in accordance with various embodiments of the claimed subject matter.

With reference now to FIG. 3, an illustration of a block diagram depicting an exemplary computing environment 300 is depicted, in accordance with embodiments of the present invention. In one embodiment, the method of scheduling a plurality of tasks to be executed in parallel described above with respect to FIG. 1 may be performed in computing environment 300. As presented, computing environment 300 includes a computing platform 301, a programming environment 303, a scheduling module 305, and storage units for logic definitions (309) and objects (311). As depicted in FIG. 3, arrows indicate dependencies between the tasks in the computing environment 300.

According to some embodiments, the computing platform 301 of FIG. 3 may comprise, the particular hardware architecture and software platforms (e.g., operating system, application platforms) of a computing system executing a medical imaging or treatment application, for example. One or more application platforms may be implemented as, for example, a programming environment 303 and comprise the programming languages, runtime libraries and graphical user interfaces of a particular application. For example, a medical treatment and/or imaging application performing the scheduling process according to FIG. 1 described above.

As depicted, a programming environment 303 may include the scheduling module 305, and storage units for logic definitions (309) and objects (311) described above with respect to FIG. 2. According to embodiments of the present invention, a schedule 307 may be generated in a scheduling module 305 in a process of generating a schedule of tasks (e.g., process depicted in flowchart 100) by creating a network of dependencies between logic definitions (e.g., "tasks") in a logic definition storage unit and then selecting the order to perform the tasks according to identified dependencies. In one embodiment, the network of dependencies between tasks may be generated by identifying the required inputs and subsequent outputs (e.g., objects in the object storage unit 311).

Therefore, a schedule 307 which has as an input Object 311a (provided through given data, such as an image, for example) may, through a schedule 307, be used to derive as output another object (Desired Object 311f) through a sequence of tasks (e.g., task 309a, 309b, 309c, and 309d) which utilize, either individually (309a) or collectively (309b, 309c, 309d) the input Object 311a to generate additional output (Objects 311b, 311c, 311d, and 311e) which may in turn be used to generate the desired output (Desired Object 311f) through the application and performance of a given sequence of tasks.

In one embodiment, the logic definition storage unit 309 may comprise a plurality of logic definitions pre-programmed in an application performing a scheduling process. In further embodiments, users of the application may add, modify, or remove particular logic definitions. Likewise, the object storage unit 311 may also comprise a plurality of objects pre-identified in an application performing a scheduling process. Thus, for example, a medical recognition application may include as objects anatomical structures (e.g., organ, vessels, etc.) in an object storage unit, whereas the logic definitions comprising the logic definition storage unit may include the particular definitions which network or map the relationships between objects in the object storage unit.

In further embodiments, the scheduler module 305 may also include logic to divide the tasks that comprise a schedule 307 into a plurality of phases and/or into a plurality of processing threads. The exact number of threads may correspond to the number of available processors in the specific computing system executing the scheduling process. The number of phases may depend, at least in part, on the particular sequence of tasks which must be performed, the dependencies within the tasks, and the estimated durations/earliest possible starting times to perform the specific tasks. Under such embodiments, for example, a schedule of tasks may be generated to derive a desired output from a given input that may be executed in parallel to leverage the presence of multiple processors in a system.

Exemplary Dependency Network

Figure 4:
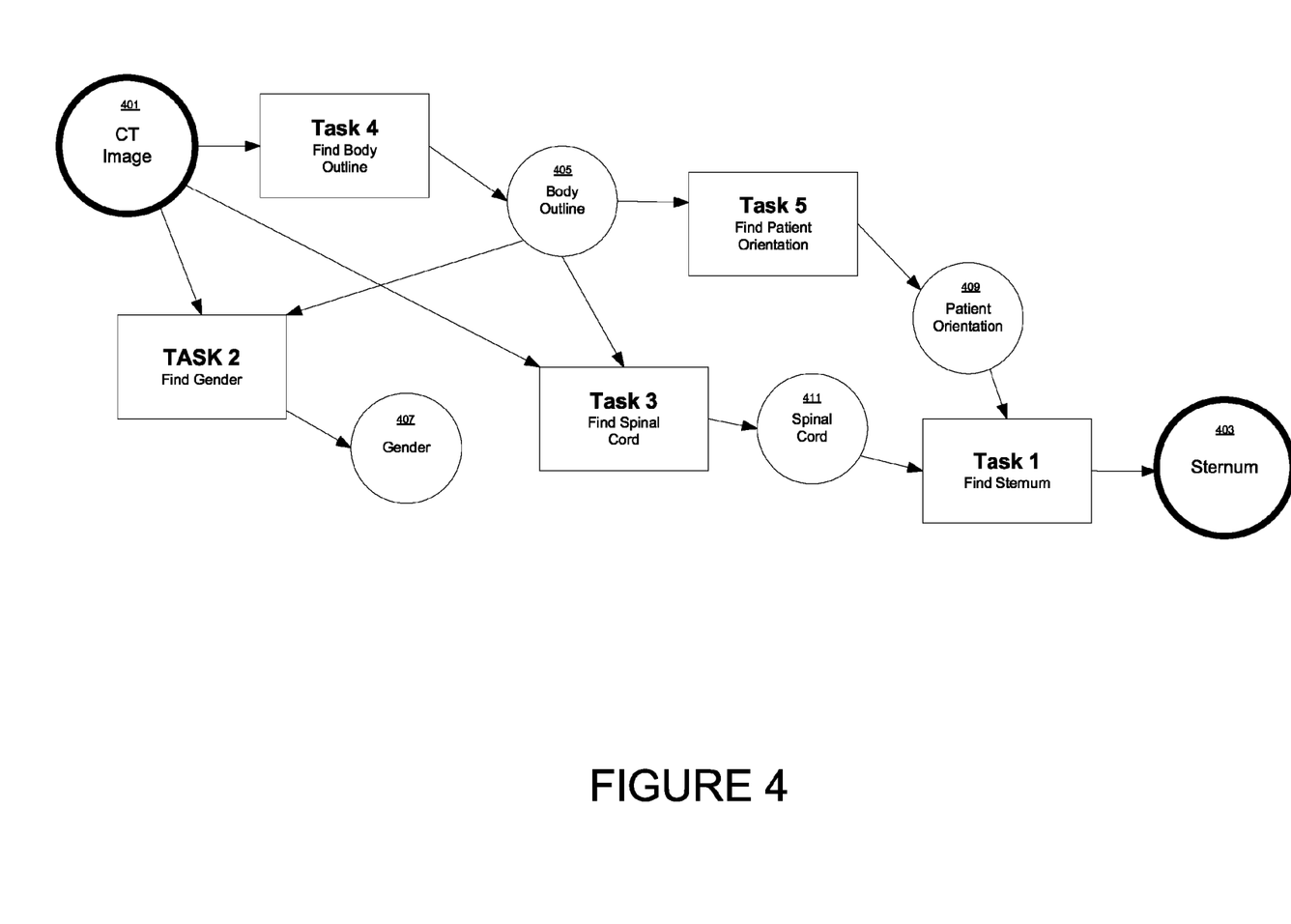
FIG. 4 is an illustration of an exemplary recognition program's dependency network, in accordance with various embodiments of the claimed subject matter.

With reference now to FIG. 4, an illustration of an exemplary recognition program's dependency network 400 is depicted, in accordance with embodiments of the present invention. In one embodiment, the generation of the dependency network 400 may be performed as an iteration of performing the process of scheduling a plurality of tasks in parallel in a computing environment, as described above with respect to FIG. 1. Moreover, the dependency network 400 may be generated as part of the schedule 307 from the computing environment 300 described above with respect to FIG. 3. As presented in FIG. 4, the arrows show the flow of information in the dependency network 400, i.e. the arrows denote an "is read by"—relationship when going from an object to a task, and a "produces" relationship when going from a task to an object.

As presented in FIG. 4, an exemplary dependency network 400 generated for an input data set (e.g., CT image 401) a desired output (e.g., Identity of Sternum 403), and a plurality of tasks (e.g. Task 1, Task 2, Task 3, Task 4 and Task 5) is depicted. Thus, for example, a desired output of a sternum may be achieved by performing the task of identifying the sternum (e.g., Task 1). As depicted in sequence 400, the task of identifying the sternum may require input of the position/location of a spinal cord (e.g., object 411) as well as the patient's orientation (e.g., object 409).

Once the immediate task which produces the desired output is identified, an entire sequence of tasks may be thus mapped. Thus, for example, the tasks which produce as output the necessary input to perform Task 1 ("Find Sternum") may be determined. In one embodiment a sequence may be mapped by determining the output available to tasks which require only the initial data set as an input, and progressively expanding the network of tasks until a "path" of tasks connects the initial image data to the desired output is determined. In instance where multiple paths may be possible, an ideal path may be selected by applying one or more heuristics (e.g., least number of tasks, shortest estimated duration of task execution, estimated earliest possible starting times for each task).

As depicted in FIG. 4, the initial CT Image data 401 may be used as input for three tasks (e.g., Task 2, Task 3, and Task 4). Task 4 "Find Body Outline" can produce the body outline 405 of the subject as output from an input of the image data 401. Task 3 "Find Spinal Cord" requires as input the body outline 405 and the initial CT data 401 to generate the spinal cord 411 of the subject. As presented, the body outline 405 generated by Task 4 may be used by Task 5 "Find Patient Orientation" to produce the subject's Patient Orientation 409. The combination of the spinal cord 411 generated by Task 3 and the patient orientation 409 generated as the output of Task 4 fulfill the input requirements of Task 1 "Find Sternum." Thus, the execution of Task 1 may be performed by first executing Tasks 3, 4 and 5 in an appropriate order. Task 2 "Find Gender" requires the image data 401 and the body outline 405 as input and generates the gender 407 of the subject of the image data 401 as output. However, execution of Task 2 is not required to produce the output sternum 403.

Exemplary Program Schedule

Figure 5:
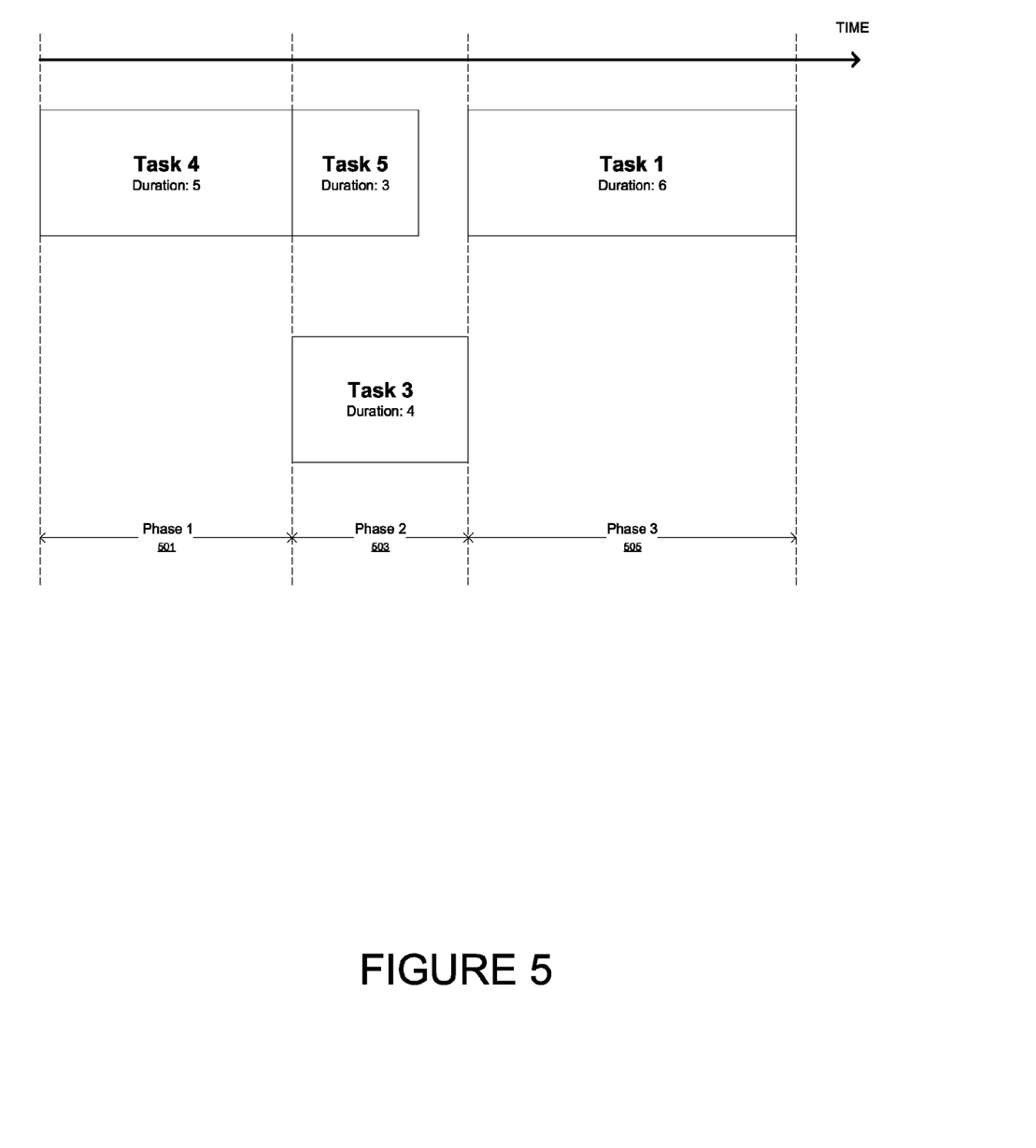
FIG. 5 is an illustration of the execution of an exemplary recognition program schedule, in accordance with various embodiments of the claimed subject matter.

With reference now to FIG. 5, an illustration of an exemplary recognition program schedule 500 is depicted, in accordance with embodiments of the present invention. In one embodiment, the recognition program schedule 500 may be implemented as a plurality of tasks distributed in parallel over a plurality of phases. The schedule 500 may be generated as the schedule 307 from the computing environment 300 described above with respect to FIG. 3. FIG. 5 depicts an exemplary optimal sequence of tasks for generating a desired output derived from the dependency network 400 described above with respect to FIG. 4.

According to some embodiments, the tasks comprising a particular sequence may be distributed among phases to correspond to respective dependencies of the tasks. For example, earlier phases (e.g., Phase 1 501) may be reserved for the tasks which do not require the prior performance of other tasks. Tasks whose outputs are used as input for several other tasks or chains of tasks may also be reserved to earlier phases. As presented in FIG. 5, Task 1, which is dependant on the output of Task 5 and Task 3, is performed during the last phase (Phase 3 505). Task 5 and Task 3, which both require the output of Task 4, are distributed in Phase 2 503. In further embodiments, phases wherein multiple tasks are scheduled may distribute the tasks for parallel processing among multiple processors. For example, Task 5 and Task 3 may be performed on separate processor cores in a multi-processor computing system. In further embodiments, the particular assignment of tasks to each processor may be scheduled, at least in part, by estimated durations or estimated earliest starting times for the respective tasks. In still further embodiments, the assignment of particular tasks may be performed dynamically, as processing resources become available. This advantageously grants the benefit of being able to generate an efficient parallel schedule with or without knowledge of durations of individual tasks, or knowledge thereof at runtime.

Accordingly, multi-phase schedules with multiple processing threads provide the ability to leverage advanced computing resources by optimally utilizing multiple processors for efficiently generating variable and customizable automatically created schedules, while still maintaining the flexibility to use serial programming in recognition algorithms for individual objects, properties, or features to comply with dependencies.

By enabling such a system, development of recognition tools by software vendors may also be advantageously streamlined, as programmers can concentrate on implementing the recognition tasks in a sequential way, free from dealing with inter-task dependencies and concurrency issues that might be obstacles in traditional methods of developing such tools.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for scheduling a plurality of tasks to produce a desired output, comprising:
    receiving an input, the input comprising a desired output, a plurality of recognition tasks, and a plurality of data sets;
    generating a dependency network for the plurality of recognition tasks by identifying a plurality of dependencies between inputs and outputs of respective recognition tasks;
    creating a schedule to perform a set of recognition tasks from the plurality of recognition tasks on a data set from the plurality of data sets in order to generate the desired output;
    dividing the schedule into a plurality of phases based on the plurality of dependencies among the set of recognition tasks in the dependency network;
    assigning the set of recognition tasks to a plurality of processors in a multi-processor system to be performed in a plurality of processing threads based on the schedule;
    performing the set of recognition tasks in the plurality of processors based on the schedule; and
    generating the desired output,
    wherein mutually independent tasks of the set of recognition tasks are distributed to a same phase,
    wherein tasks of the set of recognition tasks having equivalent earliest possible starting times are distributed to the same phase;
    wherein the data set comprises data representative of an image comprising a plurality of graphical structures, the image being generated by a medical imaging device,
    further wherein the desired output comprises an identification of a specified plurality of graphical structures of the plurality of graphical structures, the identification being obtained by performing the set of recognition tasks according to the schedule.

2. The method according to claim 1, wherein the image comprises an image of at least a portion of a subject anatomy and the plurality of graphical structures comprises a plurality of anatomical structures.

3. The method according to claim 1, wherein the input comprises a recognition program.

4. The method according to claim 1, wherein the plurality of recognition tasks comprised in the input is arranged in at least one of: a table or a list.

5. The method according to claim 1, wherein the generating the dependency network comprises:
    analyzing the plurality of recognition tasks to derive a plurality of respective inputs and outputs for the plurality of recognition tasks; and
    mapping an order of the plurality of recognition tasks according to the plurality of respective inputs and outputs.

6. The method according to claim 1, wherein the generating, the creating, and the assigning are performed automatically.

7. The method according to claim 1, wherein the generating, the creating, and the assigning are performed in a computing device.

8. The method according to claim 1, further comprising:
    executing the set of recognition tasks in the plurality of processors, wherein the executing the set of recognition tasks in the multi-processor system comprises executing at least a portion of the set of recognition tasks in parallel.

9. The method according to claim 1, wherein the creating a schedule comprises:
    generating an order to perform the set of recognition tasks according to respective dependencies of the dependency network for the set of recognition tasks; and
    distributing the set of recognition tasks in the plurality of phases according to the order.

10. The method according to claim 9, herein the dividing the schedule into a plurality phases comprises calculating respective earliest possible starting times for the set of recognition tasks.

11. The method according to claim 1, wherein assigning the set of recognition tasks among the plurality of processors is performed dynamically during an execution of the plurality of phases.

12. The method according to claim 1, wherein assigning the set of recognition tasks among the plurality of processors may be performed according to a pre-defined method of allocation prior to an execution of the set of recognition tasks comprised in the schedule.

13. A non-transitory computer readable medium containing program instructions embodied therein for causing a computer system to implement dynamic scheduling of a plurality of recognition tasks to produce a desired output, the program instructions comprising:
    instructions to receive an input, the input comprising a desired output, a plurality of recognition tasks, and a plurality of data sets;
    instructions to generate a dependency network for the plurality of recognition tasks by identifying a plurality of dependencies between inputs and outputs of respective recognition tasks;
    instructions to create a schedule according to the dependency network to perform a set of recognition tasks comprised in the plurality of recognition tasks to generate the desired output;
    instructions to divide the schedule into a plurality of phases based on a plurality of dependencies among the set of recognition tasks in the dependency network;

instructions to assign the set of recognition tasks to a plurality of processors in a multi-processor system to be performed in a plurality of processing threads based on the schedule;
instructions to perform the set of recognition tasks in the plurality of processors based on the schedule; and
instructions to generate the desired output,
wherein mutually independent tasks of the set of recognition tasks are distributed to a same phase,
wherein tasks of the set of recognition tasks having equivalent earliest possible starting times are distributed to the same phase,
wherein the data sets comprises data representative of an image comprising a plurality of graphical structures, the image being generated by a medical imaging device,
further wherein the desired output comprises an identification of a specified plurality of graphical structures of the plurality of graphical structures, the identification being obtained by performing the set of recognition tasks according to the schedule.

14. The non-transitory computer readable medium according to claim 13, wherein the program instructions further comprise instructions to execute at least a portion of the set of recognition tasks in parallel.

15. The non-transitory computer readable medium according to claim 13, wherein at least one of the plurality of data sets comprises a set of computer tomography (CT) generated images.

16. The non-transitory computer readable medium according to claim 13, wherein at least one of the plurality of data sets comprises a set of cone-beam computer tomography (CBCT) generated images.

17. The non-transitory computer readable medium according to claim 13, wherein the instructions to generate the dependency network comprises:
instructions to analyze the plurality of recognition tasks to derive a plurality of respective inputs and outputs for the plurality of recognition tasks; and
instructions to map an order of the plurality of recognition tasks according to the plurality of respective inputs and outputs.

18. The non-transitory computer readable medium according to claim 13, wherein the instructions to create a schedule comprises:
instructions to generate an order to perform the set of recognition tasks according to respective dependencies of the dependency network for the set of recognition tasks; and
instructions to distribute the set of recognition tasks in the plurality of phases according to the order.

19. A system for scheduling a plurality of recognition tasks to operate in parallel, the system comprising:
a multi-processor computing system;
a plurality of processors of the multi-processor computing system;
a memory, comprising a plurality of programmed instructions which, when executed by the plurality of processors is operable to execute:
a computing platform;
a programming environment disposed in the computing platform;
an object storage unit comprising a plurality of objects, the object storage unit disposed in the programming environment;
a recognition logic definition storage unit, the recognition logic definition storage unit comprising a plurality of recognition logic definitions, wherein a recognition logic definition of the plurality of recognition logic definitions comprises an input of image data and an output corresponding to recognition of a plurality of objects in the image data; and
a scheduler unit configured to:
i. receive an input comprising a desired output, a plurality of recognition tasks, and a plurality of data sets, to generate a network of dependencies between the plurality of recognition logic definitions,
ii. automatically create a schedule to perform a set of recognition logic definitions of the plurality of recognition logic definitions on a data set from the plurality of data sets,
iii. divide the schedule among a plurality of phases based on the network of dependencies,
iv. assign the set of recognition tasks to the plurality of processors in a multi-processor computing system,
v. perform the set of recognition tasks in the plurality of processors based on the schedule,
vi. generate the desired output,
wherein mutually independent tasks of the set of recognition tasks are distributed to a same phase,
wherein tasks of the set of recognition logic definitions having equivalent earliest possible starting times are distributed to the same phase of the plurality of phases,
wherein the sequence of logic definitions is performed in the plurality of processors of the multi-processor computing system and executed in parallel.

* * * * *